United States Patent [19]
Jörn et al.

[11] 3,781,073
[45] Dec. 25, 1973

[54] BEARING

[75] Inventors: Raoul Jörn, Hengnau; Peter Reichardt, Fellbach, both of Germany

[73] Assignee: Raoul Jorn, Hengau, Post Wasserburgh A.B., Germany

[22] Filed: Feb. 22, 1972

[21] Appl. No.: 228,153

[30] Foreign Application Priority Data
Feb. 20, 1971 Germany............... P 21 08 154.9
Sept. 6, 1971 Germany............... P 21 44 507.8

[52] U.S. Cl................ 308/238, 287/85 R, 308/26
[51] Int. Cl. ........................................... F16c 33/04
[58] Field of Search............. 308/238, 26; 287/85 R

[56] References Cited
UNITED STATES PATENTS
3,368,852  2/1968  Herbenar et al.............. 308/26
3,494,676  2/1970  Compton...................... 308/238
3,108,830  10/1963  Fierstine..................... 308/238
3,130,991  4/1964  Piragino...................... 308/238
2,797,929  7/1957  Herbenar..................... 287/85 R
2,940,785  6/1960  Haushalter................... 287/85 R
3,096,128  7/1963  Wight......................... 308/238
3,112,123  11/1963  True........................... 308/238

Primary Examiner—Charles J. Myhre
Assistant Examiner—Barry Grossman
Attorney—Karl F. Ross

[57]  ABSTRACT

A bearing, joint or knuckle, e.g. between a steering rod and a lever or arm connected to a wheel in an automotive stearing linkage, is provided with an inner and/or an outer metal shell or sleeve to which a rubber layer is vulcanized, the force being transmitted between the inner surface and the outer surface of the joint through elastic deformation of the elastomeric layer. One or both of the shells is, according to the invention, slotted parallel to generatrices of the shell.

60 Claims, 24 Drawing Figures

PATENTED DEC 25 1973

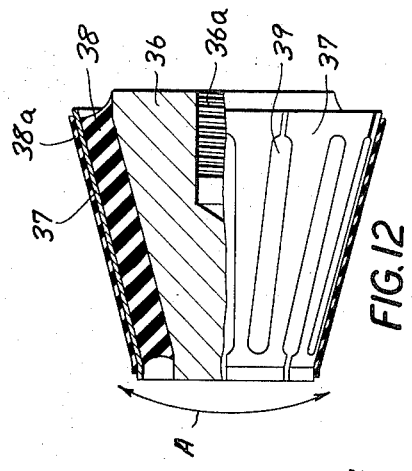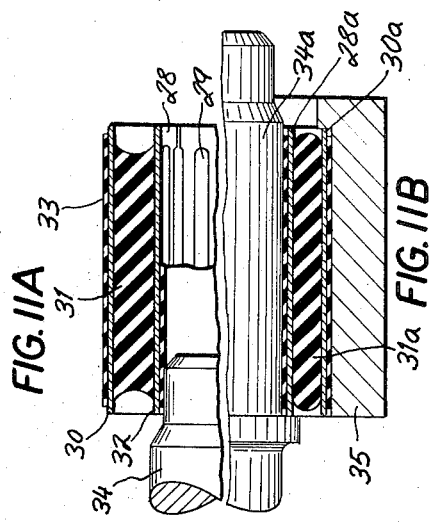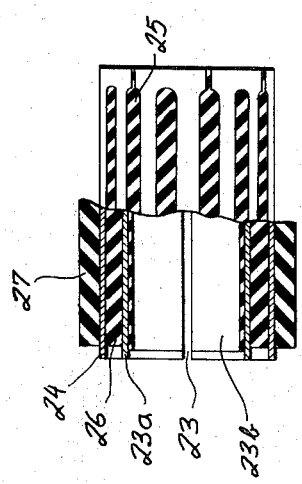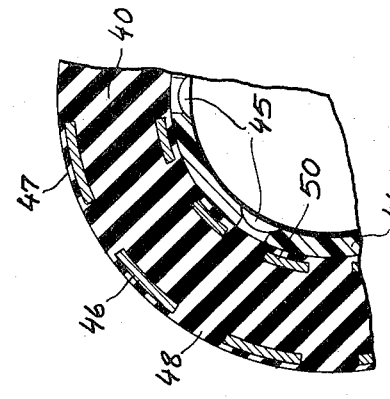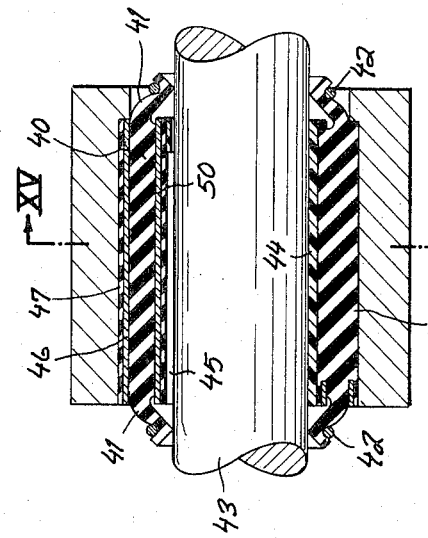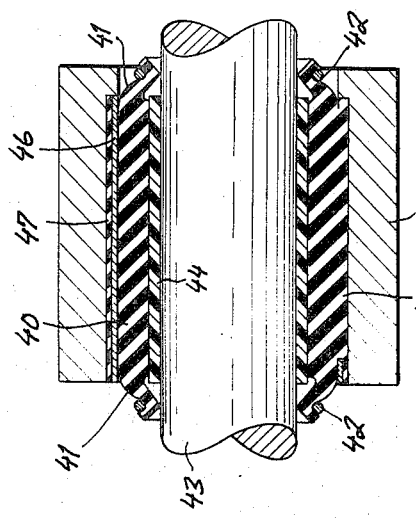

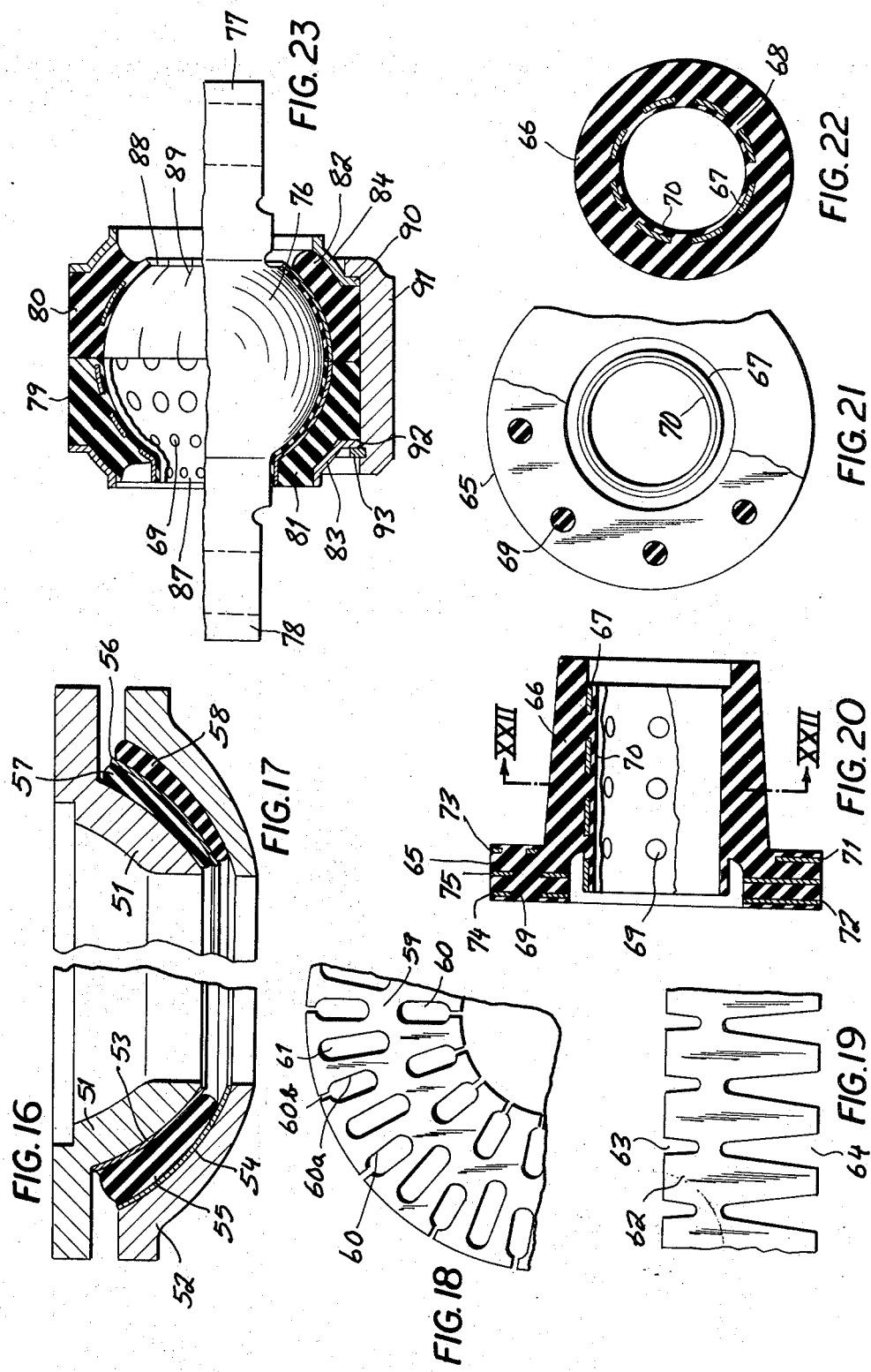

BEARING

CROSS-REFERENCE TO RELATED APPLICATIONS

This application is related to application Ser. No. 86,167 filed 2 November 1970 (now U.S. Pat. No. 3,666,301) and entitled "PIVOT OR SUPPORT SLEEVE WITH RESILIENT LAYER", the applicant being Raoul Jörn, the assignee of the instant case and a coinventor of the subject matter thereof.

FIELD OF THE INVENTION

Our present invention relates to a bearing, joint or knuckle sleeve having a resilient layer and adapted to be interposed as a force-transmitting and/or vibration or shock-damping member between two parts relatively pivotable or displaceable about the axis of the sleeve. More particularly, the invention relates to a pivot or support sleeve with a resilient layer, e.g. for use in a steering linkage of an automotive vehicle.

BACKGROUND OF THE INVENTION

It has been proposed, in the above-identified application and elsewhere, to provide elastomeric layers between relatively movable parts to serve as vibration or shock dampers and/or to transmit force (e.g. a torque) between the two parts. For the most part, a metal layer is applied to one surface of an elastomeric sleeve while a second metallic layer or shell is applied to the other periphery. When the resulting spring is used as a vibration or shock-damping member, the outer shell is secured to one body while the inner shell is secured to the other. When the bodies are angularly displaceable about the axis of the composite spring thus resulting, torque may be transferred by the elastomeric layer. In general, force is transmitted to the elastomeric layer by distortion of the layer within the elastic limit, upon a shell-type displacement of one surface to bring about an equivalent displacement of the other.

It is important, in all such elastomeric pivot bearings to ensure a continuous and unoffset relationship between an inner or outer metal sleeve and the elastomer layer bonded thereto. In other words, a relative frictional shifting of the metal sleeve and the adjacent elastomer layer must be precluded, without, however, materially preventing shear forces from elastically deforming the elastomeric layer. On the other hand, it has been a problem in conventional systems to prevent radial distortion of the sleeve and the entire assembly, such distortion preventing the pivot from rotating properly within the bearing. Another important characteristic of composite bearing arrangements of this character is that the elastomer layer must be prestressed (i.e. precompressed) in the appropriate direction to resist the shear forces mentioned above.

In cylindrical pivot bearings and sheeves, e.g. for automotive-vehicle steering systems, it has been proposed to provide a highly precompressed rubber layer or ring between an inner slotted sleeve and an outer slotted sleeve, the sleeves bearing against the elastomer layer under friction. Such pivot arrangements are expensive and the systems for mounting same are complicated and difficult. During removal, it is not always possible to prevent distortion so that reuse is often impossible.

The composite sleeves in elastomer assemblies, according to the present invention, are particularly intended for use as steering-knuckle pivots in automotive-vehicle systems, pivot arrangements between the tie rod and the steering-knuckle arms, the pivot between the drag link and the steering-knuckle arms or tie rod, the pivot between the pitman arm and the drag links, the pivot between an intermediate knuckle arm and a chassis member and the pivots between the intermediate knuckle arms, drag link and tie rods. In other words, wherever a pivot arrangement, ball joint, knuckle or the like may be used in an automotive-vehicle steering system or like arrangement and some relative angular movement and lateral axial or other further mobility, within a relatively limited range, is desired, the system described below may be employed.

OBJECTS OF THE INVENTION

It is the principal object of the present invention to provide a sleeve-type junction arrangement of the character described which will avoid the above-mentioned disadvantages and to further the principles of the commonly assigned application mentioned earlier.

Yet another object of the invention is to provide an improved ball joint or like pivot arrangement for an automotive steering linkage.

SUMMARY OF THE INVENTION

These objects and others which will become apparent hereinafter are attained, in accordance with the present invention, in a ball joint or other pivot joint, particularly for an automotive-vehicle steering system wherein the transverse yielding of the elastomer layer at its outer and inner diameters, because of a relative shifting of this layer with respect to the inner and outer metal parts, is positively prevented and the elastomer layer is held under radial compression (prestress) in a simple and convenient manner whereby the pivot can be easily inserted and removed so that only a coarse fitting is required. An important characteristic of the invention is also that the elastomeric pivot assembly may be used for relatively small parts of the steering linkage and is, in turn, of small size and capable of being used in simple and lightweight structure.

These advantages are gained in a steering-linkage pivot consisting of a generally tubular or hollow elastomer layer having at least one peripheral metal sleeve running from one axial end face to the other axial end face and provided with longitudinal slits terminating at both end faces and distributed in angularly spaced relationship about the metal sleeve. In other words, one or both of the metal sleeves is provided with longitudinally extending slits or slots running from one end face of the assembly until the opposing end face thereof. In this manner, the transverse yielding of the elastomer at the interface at which the elastomer ring is bonded to the metal sleeve, is limited in an unobjectionable manner.

According to a more important feature of the present invention, the elastomeric ring is vulcanized to a sheet-metal sleeve or shell having the configuration of a surface of rotation defined by rotating a generatrix about the axis of the pivot assembly and provided with elongated windows along generatrices and in angularly spaced relationship such that the windows extend in the axial direction, i.e. along the respective generatrix over the major portion of the length of the sleeve or shell along this generatrix. In other words, at least 50 percent and preferably 70 percent or more of the length of the generatrix is constituted by one or more elongated openings collectively defining a window and hereinafter referred to as a relatively wide slot. We have found it to be advantageous to terminate the relatively wide slot, at one longitudinal end thereof, in the form of a narrow slot running to the edge of the sheet-metal strip or member which is to be rolled to form the shell or sleeve. Advantageously, a web of sheet metal, preferably having a length along the generatrix which is a minor fraction of the generatrix length and the window or opening length which holds the strip together and may be located at the end of the slot opposite that of the narrow portion or at an intermediate location along the window subdividing it into a plurality of openings. It has been found to be advantageous, moreover, to permit the elastomeric material to pass through the windows and to form at least a thin elastomer film on the side of the sheet-metal shell opposite the main body of the elastomeric material. The elastomeric material can then be vulcanized to both broad surfaces of the sheet-metal shell.

The system described above, wherein the shell and the elastomeric body surrounding it or surrounded by it, may have a cylindrical, frustoconical or generally spheroidal shape, or a shape which is a hybrid thereof, has numerous advantages. Firstly, the relative frictional shifting of the elastomeric body and the, or each, metal sheeve or shell is precluded and the useful life of the assembly increased. The bearing or pivot member is radially expandable upon insertion of a pin or stud of a larger diameter than the nominal diameter of the assembly and, upon insertion of the assembly in a surrounding inelastic bushing, the insertion of a larger stud may suffice to provide the desired degree of precompression. Of course, in addition to being radially expandible, the assembly has a certain degree of contractibility and the precompression can be provided by inserting a stud or stud shaft of a diameter equal to or smaller than the nominal diameter of the assembly and then inserting the assembly into an inelastic bushing of a diameter smaller than the nominal outer diameter of the assembly. It is, therefore, not necessary to be concerned with the tolerances of either the stub shaft, stud, pin, etc. or of the surrounding bushing. The mounting of the device is relatively simple as already indicated and it can be dismounted with ease. Upon removal of the inner pin, the precompression is relieved and the bearing member can simply be withdrawn from any retaining bushing and reused elsewhere or introduced again into a pivot assembly.

We have already noted that the longitudinal slits, which terminate at both ends of the assembly, may be provided with transversely extending narrow connecting webs which interrupt windows and preferably have a width equal to or less than the width of the wide portion of the windows. The windows reach over substantially the entire width of the sleeve or shell beyond its end as mentioned earlier and preferably terminate at least at one end of each window along an edge of the sheet-metal strip which is rolled to form the shell. Where single-opening windows are provided along each generatrix, we prefer to alternate the windows so that the alternate windows have narrow slot portions opening on opposite sides of the sheet metal strip. With plural-opening windows, however, a narrow slot portion is provided for each window at each side of the strip. In these systems, an especially uniform distribution of stress is obtained and a relatively high degree of expansion and contraction is made possible and a high degree of compression can be generated without overstressing of distorting the metal strip. It will also be apparent that the aforedescribed arrangement provides improved frictional engagement with both the inner pin and the outer sleeve or bushing.

An importnat feature of the present invention is that the width W at least of the main portion of each window is much greater than the thickness $t$ of the sheet-metal strip from which the sleeve or shell is rolled. In practice, W may equal $3t - 15t$ and preferably between $5t$ and $8t$. Moreover, the slotted metal is so provided with windows that at least 40 percent of the area of the sheet-metal shell or strip and preferably more than 50 percent of the area is formed by these openings. These relationships guarantee an effective inner film of elastomer along the inner surface of an inner sheet-metal shell and/or an effective outer film along the outer surface of the outer shell, these films or elastomer layers being deflectible through the windows into the elastomer body between the shells upon radial compression. Since the elastomer acts as a confined fluid, the radial stiffness remains unaltered upon such compression although a more effective journaling of the rotatable member is ensured. Here again, the useful life of the elastomer body is increased. Advantageously, the system permits torque transfer between the inner pin and the outer bushing in a particularly convenient manner and without slippage at the interface between the elastomer and the metal shells. The overall stiffness of the system, moreover, is augmented by the presence of elastomer in the windows and by the force absorbed by the system in tending to draw these portions of the elastomeric material out of the windows. Finally, we should mention that the bearing assemblies of the present invention can be made inexpensively and simply by the stamping of the parts from sheet metal, thereby controlling the stiffness of the metal shell or sleeve with ease. Relatively small bushings and pins may be used with the bearing assemblies of this invention.

DESCRIPTION OF THE DRAWING

The above and other objects, features and advantages of the present invention will become more readily apparent from the following description reference being made to the accompanying drawing in which:

FIG. 10 is an elevational view of a cylindrical pivot assembly according to another feature of the invention, partly broken away and partly shown in axial cross-section;

FIG. 11A is a fragmentary axial cross-sectional view showing another cylindrical arrangement according to the invention prior to insertion into its working position;

FIG. 11B is a view similar to FIG. 11A of the same cylindrical pivot assembly after insertion;

FIG. 12 is an end elevational view, partly in axial cross-section, of a conical pivot assembly according to the invention;

FIG. 13 is an axial cross-sectional view showing still another cylindrical arrangement in its working position;

FIG. 14 is a view similar to FIG. 13 but illustrating another embodiment of the invention;

FIG. 15 is a fragment of a cross-section taken along the line XV-XV of FIG. 14 and drawn to an enlarged scale;

FIG. 16 is a fragmentary axial cross-sectional view through a ball joint embodying the principles of the invention;

FIG. 17 is a view similar to FIG. 16 but illustrating another embodiment of the invention;

FIG. 18 is an elevational view of a portion of the sheet-metal sleeve for a ball joint according to the present invention, prior to shaping and, therefore, in a developed state;

FIG. 19 is a developed view of a metal strip adapted to be incorporated into a conical joint according to the invention and likewise representing this strip in an unrolled state;

FIG. 20 is an axial cross-sectional view through a general conical pivot assembly according to the present invention, the assembly having a radially extending annular flange at the broad base of the frustocone;

FIG. 21 is an end view, partly broken away of the assembly of FIG. 20;

FIG. 22 is a cross-section taken along the line XXII—XXII of FIG. 20; and

FIG. 23 is a ball joint representing a modification of the system shown in FIG. 20.

SPECIFIC DESCRIPTION

Figure 1:
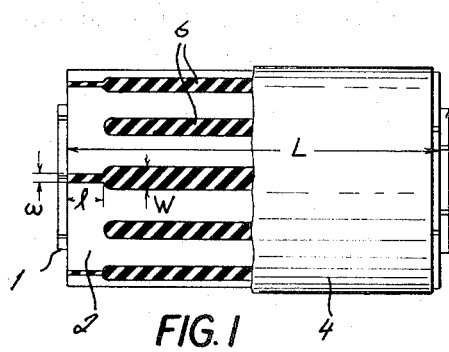
FIG. 1 is an elevational view, partly broken away, of a cylindrical pivot assembly according to the present invention.
Figure 2:
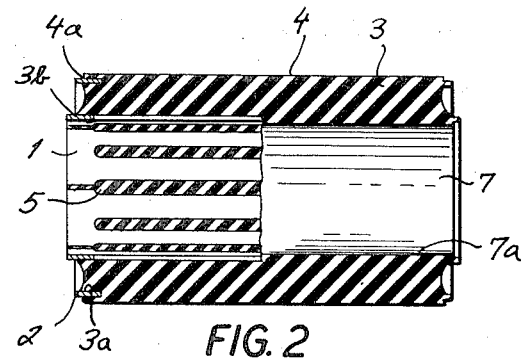
FIG. 2 is a partial axial cross-sectional view through the cylindrical pivot assembly of FIG. 1.

In FIGS. 1 and 2, we have shown a pivot assembly for an automotive-vehicle steering linkage which comprises an outer metal sleeve 2, an inner metal sleeve 1 and a rubber layer, ring or cylindrical body 3, vulcanized to the metal sleeves. As can be seen from FIG. 2, the rubber ring 3 not only is vulcanized at the inner surface 3a of the outer ring and the outer surface 3b of the inner ring, but also has thin rubber layers 4 and 7 which extend through windows 5 and 6 in the inner and outer sleeves and are continuous along the outer periphery and the inner periphery of the assembly. The layers 4 and 7 are respectively vulcanized to the outer surface of the metal sleeve 2 at 4a and the inner surface of the metal sleeve 1 at 7a while substantially completely covering these surfaces. The film 7 has been stripped away from the left-hand half of the inner sleeve 1 in FIG. 2 so that the windows 5 can be seen clearly. Similarly the layer 4 has been stripped away from the left-hand part of the outer sleeve 2 to reveal the windows 6. As is also apparent from FIGS. 1 and 2, the windows 5 and 6 each consist of slots opening alternately at opposite end faces of the cylindrical bodies, the windows having relatively large width W over the greater part of the length L of the respective sleeve but terminating alternately at opposite ends in small lengths $l$ of narrower portions with a width $w$. Advantageously, the ratio $W/w$ ranges between 3:1 and 10:1, the length ratio $L/l$ ranges between 8:1 to 20:1 and the actual length $S = 0.7$ L to 0.95L. As will be apparent hereinafter, the window along a respective generatrix of the sleeve may be subdivided into a plurality of openings having lengths $S'$ and preferably totalling S as defined above. In any event $S = \Sigma_n S'$ where $\Sigma_n$ represents summation over each of the openings along a single generatrix and S is at least equal to 0.5 L where L is the generatrix. Furthermore, S may range between 4 W and 10 W but preferably is between 5 W and 6 W, inclusive.

Figure 3:
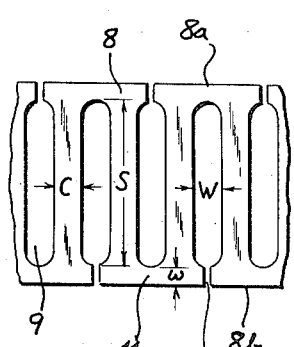
FIG. 3 is an elevational view of the metal sheet adapted to form a sleeve for the cylindrical pivot assembly of FIGS. 1 and 2 prior to the rolling of the strip into the sleeve configuration and representing, therefore, a partial developed view of the metal sleeve.

In FIGS. 3 – 6, we have shown metal strips according to the invention prior to rolling. In FIG. 3, the strip 8 has parallel sides 8a and 8b at which the windows in the form of slots 9, 10 open in alternately opposite directions. Each slot consists of the wide portion 9 mentioned earlier and a narrower portion 10. Narrow webs 11 whose width $w = l$ serve to hold the strip together.

Figure 4:
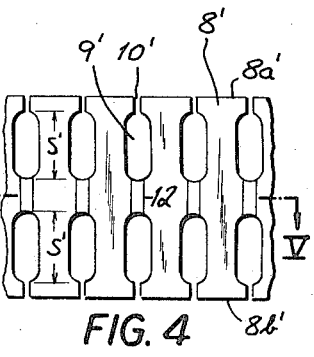
FIG. 4 is a view similar to FIG. 3 wherein, however, a different slot arrangement is provided.
Figure 6:
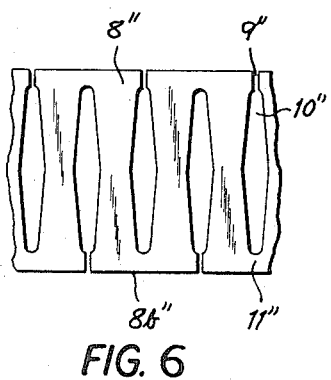
FIG. 6 is a view similar to FIG. 3 illustrating another embodiment of the invention.
Figure 5:
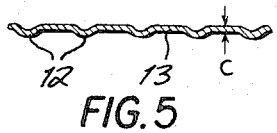
FIG. 5 is a cross-sectional view taken along the line V—V of FIG. 4.

In the embodiment of FIGS. 4 and 5, the windows are not staggered. In this case, each of the windows opens on both sides of the strip but is subdivided along a generatrix of the eventual cylinder to provide openings 9' of shorter length $S'$ so that webs 12 of metal remain between the two openings of each window. The strip 8' is thus held together by the webs 12 while the narrow slot portions 10' open at both longitudinal edges 8a' and 8b'. FIG. 5 shows that the metal strip may be provided with corrugations or ridges 13 separated by troughs and defining the webs as illustrated. In FIG. 6, the wide portion 9'' of each window is provided with generally triangular portions merging at a broad base and terminating at one end in the narrow slot 10'' while the opposite end of the window ends close to the longitudinal edge 8b'' of the metal strip 8'' but defines the connecting web 11'' therewith. In the embodiments of FIGS. 3 and 4, the wide portions of the windows have parallel sides.

Figure 7:
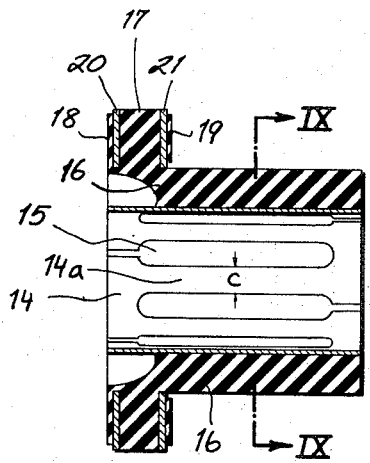
FIG. 7 is an axial cross-sectional view through a generally cylindrical pivot or bearing assembly according to the present invention, having an annular radially extending flange at one end thereof.
Figure 8:
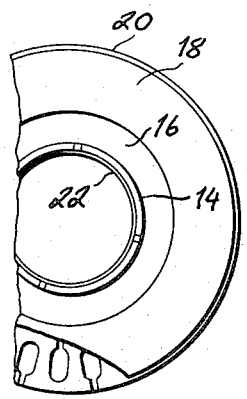
FIG. 8 is an end view of the assembly of FIG. 7.
Figure 9:
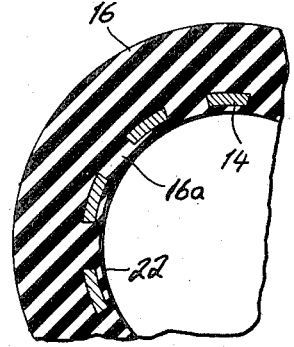
FIG. 9 is an enlarged cross-sectional view, in fragmentary form, corresponding to a cross-section along the line IX—IX of FIG. 7.

In FIGS. 7 – 9, we have shown a bearing system adapted to be used in place of the ball joint in a steering linkage wherein an inner metal sleeve 14 is provided with slots 15 as described in connection with FIG. 3 and is surrounded by a body 16 of elastomeric material vulcanized to the sheet-metal sleeve. As is apparent from FIGS. 8 and 9, the windows 15 of the sheet-metal sleeve 14 are spaced apart by narrow webs 14a of the sheet-metal material, the webs 14a having a transverse width C (see FIG. 3) which at most is equal to the width W. This relationship can best be seen in FIG. 9 from which it is apparent that the elastomeric material 16 includes a ligature 16a filling each window 15 and unitarily bonded to the layer 22 of the elastomer which lines and is bonded to the inner surface of the metal sleeve 14. The elastomeric body 16, which is molded to form a flange 17 unitary with the other portions of the elastomer sleeve, is provided with a metal ring 21 which is likewise slotted to allow an elastomer layer 16 to form along the right-hand or outer face of the ring 21. The ring 20 along the back of the flange is likewise slotted to permit the layer 18 of elastomer to form on its face.

As can be seen in FIG. 8, the slots 20a in the rings 20 and 21 may have the same configuration as described in connection with FIG. 3.

A modification of the system is illustrated in FIG. 10 wherein the inner sheet-metal shell 23a is provided with only a single throughgoing slot 23, e.g. formed by rolling an unperforated strip of sheet metal so that the juxtaposed ends do not touch. An elastomer body 26 is vulcanized to the outer surface of the sleeve 23a which may be coated internally with an elastomer layer 23b, while a slotted shell 24 is provided along the exterior of the elastomer body 26 and is formed with slots 25 as described in connection with FIG. 3. The outer elastomer layer 27 is vulcanized to the outer surface of sleeve 24 and through the windows 25 thereof to the inner layer 26. The right-hand side of FIG. 10 shows the sleeve 24 in elevation with the elastomer layer cut away so that the windows 25 will be more readily apparent. In this embodiment as well, it is apparent that ligatures of elastomeric material bond the elastomer layers together.

In FIG. 11A, we have shown an arrangement which is generally similar to that of FIG. 2, i.e. a system in which an outer slotted cylindrical sleeve 30 and an inner slotted cylindrical sleeve 28 sandwich an elastomer layer 31 between them. The elastomer layer 31 is, of course, vulcanized to the slotted metal sleeves which are of the configuration described in connection with FIG. 3, and is unitary with inner and outer rubber layers 32 and 33 connected to the main rubber body through the windows 29 of the metal shells. In this embodiment, the stud 34 is shown to be inserted into the interior of the assembly which is not materially compressed thereby. Thereafter, the entire assembly is inserted into a sleeve 35 (FIG. 11B) whose inner diameter is smaller than the nominal outer diameter of the bearing such that the elastomer layer 31a is compressed between the stud 34 and the bushing 35. The body 31a of elastomeric material thus can be considered under prestress.

Another arrangement has been shown in FIG. 12 wherein a conical metal body 36 having a threaded bore 36a adapted to receive a bolt forming part of a pivot system for an automotive steering linkage (see pages 402 ff. of PRINCIPLES OF AUTOMOTIVE VEHICLES, U.S. Government Printing Office, Washington, D.C. 1956), is bonded by vulcanization to the frustoconical body 38 of elastomeric material. A metal shell 37 whose generatrices run parallel to those of the frustoconicl surface of member 36, is provided with windows 39 as previously described and is vulcanized to the elastomeric material 38, a portion of which forms a layer 38a along the exterior of the shell 37. It should be understood that the assembly of FIG. 12 is stressed by inserting the assembly into sleeve or cup whose conicity (conical half angle) is the same as that of shell 37 but which has a diameter less than that of this shell whereby the body of the elastomer 38 is compressed. In all of the embodiments described, the outer or bushing member can rotate while the inner or stud member remains fixed or vice versa. Both can be movable relative to some third element and inevitably some lateral or radial displacement may be encountered. In the case of the arrangement of FIG. 12, the inner member 36 may twist to a greater or lesser extent in the direction of arrow A in an axial plane through the assembly. The yieldable joint of the present invention, however, permits such movement with three degrees of freedom, with the limtations provided by the elasticity of the elastomeric material.

Still another embodiment of the invention has been illustrated in FIG. 13 wherein the shaft 43 is provided with an outer sleeve 44 of a low-friction synthetic resin, e.g. polytetrafluoroethylene, enabling the shaft to rotate with respect to the outer member or bushing 49. The bearing assembly is first thrust over the shaft 43 and then passed into the bushing 49. The slots or windows 48 in the sheet-metal outer shell 46 are thereby compressed circumferentially and the elastomer layer 40 vulcanized to this metal shell is radially compressed. The outer layer 47 of elastomer which passes through the windows 48 and forms a layer along the exterior of the assembly, is snugly received in the bushing 49. This layer 47 provides frictional retention of the bearing as the shaft 43 rotates.

The sleeve 44 is provided, as is best seen in FIG. 14, with longitudinally extending grooves 45 (see also FIG. 15) which can contain a lubricant. An inner sleeve 50 may be interposed between the elastomer layer 40 and the plastic sleeve 44 as also has been illustrated in FIG. 14. In both of the embodiments (FIGS. 13 and 14), the elastomeric body is provided with sealing lips 41 at its opposite extremities projecting beyond the sleeves and held by a respective compression ring 42 against the shaft. The rings 42 provide a generally radially inward bias to cause the lips 41 to hug the shaft as indicated.

In the embodiment of FIG. 17, the elastomeric body 55, composed of natural or synthetic rubber, is sandwiched between a pair of metal shells 53 and 54 bent from flat annular disks as shown in FIG. 18. Both FIG. 16 and FIG. 17 show ball joints in which the male member 51 is received within the bearing assembly of the present invention while a ball-shaped cap 52 is mounted thereon. The elastomeric layers shown at 4 and 7, for example, in FIG. 2 likewise have their counterparts in layers located between member 51 and shell 53 and between shell 54 and member 52 respectively. The ball joints in the position illustrated in FIGS. 16 and 17, moreover, are adapted to carry a vertical load continuously applied from above and may form the rotary bearing of a freight car pivot or king pin. The load continuously applied from above forms the precompressive stress. The embodiment of FIG. 17 makes use of a single metal shell 56 sandwiched elastomeric layers which are vulcanized thereto, the shells being slotted as previously described. In FIG. 18, the slot arrangement of the shells is shown in greater detail. Thus the slots 60 may lie along respective generatrices and can be separated by a narrow web 59 analogous to the web 12 previously described. In the flattened position of the disk from which the shell is bent, these generatrices correspond to radii. The large-width slots 60 comprise wide portions 60a and narrow portions 60b, the latter terminating at the periphery of the disk. Between these double-opening windows, there may be provided further windows 61 which reduce the inter-window spacing but need not extend the full generatrix-length of the member. Of course, when the disk is bent into the spheroidal configuration shown at 53, 54 or 56, the windows may permit ligatures of the rubber (from layer 55 or the layers 57 and 58) to pass therethrough. It has been found to be advantageous, in this connection, to leave at least some of the windows free and provide a lubricant therein (this system may be used as well with the embodiments previously described). The elastomer bodies 55, 57 and 58 are secured to the metal shells 53, 54 and 56 by vulcanization.

In FIG. 19, we have shown a strip of metal 62 in which the slots converge inwardly from opposite longitudinal edges of the strip thereby facilitating a bending of the strip into a conical or ball configuration. The slots 63 and 64 may be aligned along generatrices of the bent member. The windows, slots etc. are preferably produced by stamping and the shells can be shaped by stamping or rolling. Preferably the slots 63 along one side are shorter than the slots 64 along the other to facilitate bending into a spheroidal configuration.

In FIGS. 20 - 22, we have shown yet another embodiment of the invention wherein a cylindrical pin can be accommodated while a conical sleeve may surround the bearing or the latter can be mounted by its flange. In this embodiment, the frustoconical tubular elastomer body 66 has a metallic shell 67 vulcanized to it and embedded therein. The shell is composed of sheet metal but, like the shells previously described, may be composed of flexible synthetic resin as well. The shell 67 is rolled from stamped sheet metal and is provided with slots, e.g. a single slot at which the ends of the sheet-metal strip are juxtaposed as shown at 68, this slot having a width which is several times the thickness of the sheet metal. The shell is perforated at 69 and is covered over its unperforated portions of the inner surface with an elastomeric film 70 as previously described. The annular flange 65 is provided along its opposite axial surfaces with metal rings 71 and 72 which are also perforated, the perforations being circular holes. The outer surfaces of these rings are covered with elastomeric linings 73 and 74. The flange 65 also has embedded therein an intermediate ring 75 which likewise is perforated. The rubber layers 70, 73 and 74 are produced by penetration of the elastomeric mass through the holes 69 and constitute a uniform film.

In FIGS. 23, there is shown a ball joint for a steering linkage having a ball-shaped support 76 provided with eyes 77 and 78 for anchoring bolts. The bearing is in this case formed as two half bearings of generally hemispherical configuration (79,80) which are disposed symmetrically upon the body 76. The hemispherical rubber bodies 81 and 82 are vulcanized to outer metal shells 83 and 84 which are provided with edge flanges 85 and 86. Metallic inner shells 87 and 88 are also vulcanized to the rubber body and have a spherical configuration complementary to that of body 76. The shells are provided with perforations as shown at 69 as well as with slots as represented at 89. A clamping sleeve 91 in the form of a cylindrical housing is pressed over the bearing members and has a shoulder against which the outer flange 90 is held when a spring ring 93 is inserted into a recess at the other axial opposite end of the sleeve 91 to bear against the flange 92.

The exterior of the inner shells 87, 88 can be provided with a film-like rubber layer 70 as is the case in FIGS. 20 - 22 or with a synthetic-resin coating of low coefficient of friction by an adhesive or by braking. The shaft is thus able to move with a minimum of frictional impediment as soon as the restoring force of the rubber is greater than the friction force in the contacting surfaces of the shaft. With small deformations, only the usual molecular displacement within the rubber body occurs. The slotted arrangement of the shells ensures a uniform distribution of pressure upon the inner member.

We claim:

1. A joint assembly, especially for the steering linkage of an automotive vehicle, comprising an annular elastomeric body having a configuration conforming to a surface of revolution; and at least one thin-wall shell conforming to said surface of revolution and vulcanized to said annular elastomeric body and provided with a plurality of elongated slots spanning said shell along generatrices thereof from end to end, a multiplicity of elongated slots being provided in said shell in angularly spaced relationship along respective generatrices and extending substantially from one side of said shell to the opposite side thereof.

2. The assembly defined in claim 1 wherein said slots terminate alternately at opposite ends of said shell.

3. The assembly defined in claim 1 wherein said shell is a rolled slotted sheet metal strip.

4. The assembly defined in claim 1 wherein said annular elastomeric body is disposed along one side of said shell, further comprising a second elastomeric body disposed along an opposite side of said shell and vulcanized thereto.

5. The assembly defined in claim 1 wherein the elastomeric material of said body is formed on opposite sides of said shell and is vulcanized thereto, at least some of said slots being free from elastomeric material and being filled with a lubricant.

6. The assembly defined in claim 1, further comprising a pin received in and spreading said shell.

7. The assembly defined in claim 1, further comprising a bushing receiving said shell and said elastomeric body and compressing the latter.

8. The assembly defined in claim 1 wherein said elastomeric body and said shell are of generally spheroidal configuration, said shell being shaped from a piece of slotted flat sheet metal.

9. The assembly defined in claim 1 wherein slotted inner and outer sheet-metal shells are vulcanized to said elastomeric body on opposite sides thereof, said shells including an inner shell and an outer shell, said assembly further comprising a respective elastomeric layer internally lining said inner shell and externally lining said outer shell.

10. The assembly defined in claim 9 wherein said slots have widths substantially larger than the thickness of the sheet metal of the shells.

11. The assembly defined in claim 1 wherein said elastomeric body and said shell are generally hemispherical, said assembly further comprising a ball member received in said elastomeric body and said shell and a further similar body of elastomeric material and shell surrounding said ball member and connected to the first-mentioned body and shell.

12. The assembly defined in claim 11, further comprising means for radially and axially compressing said bodies against said ball member.

13. The assembly defined in claim 1, further comprising a sleeve of a low-friction synthetic resin received in said elastomeric body and said shell and adapted to accommodate a shaft.

14. A joint assembly, especially for the steering linkage of an automotive vehicle, comprising an annular elastomeric body having a configuration conforming to a surface of revolution; and at least one thin-wall shell conforming to said surface of revolution and vulcanized to said annular elastomeric body and provided with a plurality of elongated slots spanning said shell along generatrices thereof from end to end, said slots forming windows extending over a major portion of the length of the respective generatrix, said shell being provided with narrow webs terminating said windows and holding said shell together.

15. The assembly defined in claim 14 wherein said slots terminate alternately at opposite ends of said shell.

16. The assembly defined in claim 14 wherein said shell is a rolled slotted sheet metal strip.

17. The assembly defined in claim 14 wherein said slots are formed over the major portion of their lengths as relatively wide windows, each of said slots having a narrow slot portion leading from the respective windows to one of said ends.

18. The assembly defined in claim 17 wherein each of said windows consists of a plurality of openings spaced apart along a respective generatrix by a web, said webs having a corrugated configuration.

19. The assembly defined in claim 14 wherein said annular elastomeric body is disposed along one side of said shell, further comprising a second elastomeric body disposed along an opposite side of said shell and vulcanized thereto.

20. The assembly defined in claim 14 wherein the elastomeric material of said body is formed on opposite sides of said shell and is vulcanized thereto, at least some of said slots being free from elastomeric material and being filled with a lubricant.

21. The assembly defined in claim 14, further comprising a pin received in and spreading said shell.

22. The assembly defined in claim 14, further comprising a bushing receiving said shell and said elastomeric body and compressing the latter.

23. The assembly defined in claim 14 wherein said elastomeric body and said shell are of generally spheroidal configuration, said shell being shaped from a piece of slotted flat sheet metal.

24. The assembly defined in claim 14 wherein slotted inner and outer sheet-metal shells are vulcanized to said elastomeric body on opposite sides thereof, said shells including an inner shell and an outer shell, said assembly further comprising a respective elastomeric layer internally lining said inner shell and externally lining said outer shell.

25. The assembly defined in claim 24 wherein said slots have widths substantially larger than the thickness of the sheet metal of the shells.

26. The assembly defined in claim 14 wherein said elastomeric body is provided with a circumferential radially extending flange at one end thereof, said assembly further comprising annular metal rings sandwiching said flange between them and vulcanized to the flange, said rings being coated with layers of elastomeric material.

27. The assembly defined in claim 14 wherein said elastomeric body and said shell are generally hemispherical, said assembly further comprising a ball member received in said elastomeric body and said shell and a further similar body of elastomeric material and shell surrounding said ball member and connected to the first-mentioned body and shell.

28. The assembly defined in claim 27, further comprising means for radially and axially compressing said bodies against said ball member.

29. The assembly defined in claim 14, further comprising a sleeve of a low-friction synthetic resin received in said elastomeric body and said shell and adapted to accommodate a shaft.

30. A joint assembly, especially for the steering linkage of an automotive vehicle, comprising an annular elastomeric body having a configuration conforming to a surface of revolution; and at least one thin-wall shell conforming to said surface of revolution and vulcanized to said annular elastomeric body and provided with a plurality of elongated slots spanning said shell along generatrices thereof from end to end, said slots being formed over the major portion of their lengths as relatively wide windows, each of said slots having a narrow slot portion leading from the respective windows to one of said ends.

31. The assembly defined in claim 30 wherein each of said windows consists of a plurality of openings spaced apart along a respective generatrix by a web, said webs having a corrugated configuration.

32. The assembly defined in claim 30 wherein said slots terminate alternately at opposite ends of said shell.

33. The assembly defined in claim 30 wherein said shell is a rolled slotted sheet metal strip.

34. The assembly defined in claim 30 wherein said annular elastomeric body is disposed along one side of said shell.

35. The assembly defined in claim 30 wherein the elastomeric material of said body is formed on opposite sides of said shell and is vulcanized thereto, at least some of said slots being free from elastomeric material and being filled with a lubricant.

36. The assembly defined in claim 30, further comprising a pin received in and spreading said shell.

37. The assemlby defined in claim 30, further comprising a bushing receiving said shell and said elastomeric body and compressing the latter.

38. The assembly defined in claim 30 wherein said elastomeric body and said shell are of generally spheroidal configuration, said shell being shaped from a piece of slotted flat sheet metal.

39. The assembly defined in claim 30 wherein slotted inner and outer sheet-metal shells are vulcanized to said elastomeric body on opposite sides thereof, said shells including an inner shell and an outer shell, said assembly further comprising a respective elastomeric layer internally lining said inner shell and externally lining said outer shell.

40. The assembly defined in claim 39 wherein said slots have widths substantially larger than the thickness of the sheet metal of the shells.

41. The assembly defined in claim 30 wherein said elastomeric body is provided with a circumferential radially extending flange at one end thereof, said assembly further comprising annular metal rings sandwiching said flange between them and vulcanized to the flange, said rings being coated with layers of elastomeric material.

42. The assembly defined in claim 30 wherein said elastomeric body and said shell are generally hemispherical, said assembly further comprising a ball member received in said elastomeric body and said shell and a further similar body of elastomeric material and shell surrounding said ball member and connected to the first-mentioned body and shell.

43. The assembly defined in claim 42, further comprising means for radially and axially compressing said bodies against said ball member.

44. The assembly defined in claim 30, further comprising a sleeve of a low-friction synthetic resin received in said elastomeric body and said sheel and adapted to accommodate a shaft.

45. A joint assembly, especially for the steering linkage of an automotive vehicle, comprising an annular elastomeric body having a configuration conforming to a surface of revolution; and at least one thin-wall shell conforming to said surface of revolution and vulcanized to said annular elastomeric body and provided with at least one elongated slot spanning said shell along generatrices thereof from end to end, said elastomeric body being provided with a circumferential radially extendin flange at one end thereof, said assembly further comprising annular metal rings sandwiching said flange between them and vulcanized to the flange, said rings being coated with layers of elastomeric material.

46. A joint assembly as defined in claim 45 wherein a multiplicity of elongated slots is provided in said shell in angularly spaced relationship.

47. The assembly defined in claim 46 wherein said slots terminate alternately at opposite ends of said shell.

48. The assembly defined in claim 46 wherein said shell is a rolled slotted sheet metal strip.

49. The assembly defined in claim 46 wherein said slots are formed over the major portion of their lengths as relatively wide windows, each of said slots having a narrow slot portion leading from the respective windows to one of said ends.

50. The assembly defined in claim 49 wherein each of said windows consists of a plurality of openings spaced apart along a respective generatrix by a web, said webs having a corrugated configuration.

51. The assembly defined in claim 46 wherein said annular elastomeric body is disposed along one side of said shell, further comprising a second elastomeric body disposed along an opposite side of said shell and vulcanized thereto.

52. The assembly defined in claim 46 whrein the elastomeric material of said body is formed on opposite sides of said shell and is vulcanized thereto, at least some of said slots being free from elastomeric material and being filled with a lubricant.

53. The assembly defined in claim 46, further comprising a pin received in and spreading said shell.

54. The assembly defined in claim 46, further comprising a bushing receiving said shell and said elastomeric body an compressing the latter.

55. The assembly defined in claim 46 wherein said elastomeric body and said shell are of generally spheroidal configuration, said shell being shaped from a piece of slotted flat sheet metal.

56. The assembly defined in claim 46 wherein slotted inner and outer sheet-metal shells are vulanized to said elastomeric body on opposite sides thereof, said shells including an inner shell and an outer shell, said assembly further comprising a respective elastomeric layer internally lining said inner shell and externally lining said outer shell.

57. The assembly defined in claim 56 wherein said slots have widths substantially larger than the thickness of the sheet metal of the shells.

58. The assembly defined in claim 56 wherein said elastomeric body and said shell are generally hemispherical, said assembly further comprising a ball member received in said elastomeric body and said shell and a further similar body of elastomeric material and shell surrounding said ball member and connected to the first-mentioned body and shell.

59. The assembly defined in claim 58, further comprising means for radially and axially compressing said bodies against said ball member.

60. The assembly defined in claim 46, further comprising a sleeve of low-friction synthetic resin received in said elastomeric body and said shell and adapted to accommodate a shaft.

* * * * *